(12) United States Patent
Zipfel

(10) Patent No.: US 6,926,321 B2
(45) Date of Patent: Aug. 9, 2005

(54) BUMPER WITH CRASH ABSORBING ELEMENT

(75) Inventor: Rainer Zipfel, Breisach-Gündlingen (DE)

(73) Assignee: Peguform GmbH, Bötzingen (DE)

( * ) Notice: Subject to any disclaimer, the term of this patent is extended or adjusted under 35 U.S.C. 154(b) by 0 days.

(21) Appl. No.: 10/385,946

(22) Filed: Mar. 11, 2003

(65) Prior Publication Data

US 2003/0173787 A1 Sep. 18, 2003

(30) Foreign Application Priority Data

Mar. 13, 2002 (DE) .......................................... 102 11 233

(51) Int. Cl.⁷ .............................................. B60R 19/26
(52) U.S. Cl. ....................... 293/102; 273/132; 273/155; 276/187.09
(58) Field of Search ................................ 293/102, 117, 293/120, 121, 132, 133, 154, 155; 296/187.01, 187.03, 187.09, 187.1, 102, 117, 120, 121, 132, 133, 154, 155; 188/377

(56) References Cited

U.S. PATENT DOCUMENTS

| | | | | | |
|---|---|---|---|---|---|
| 4,413,761 | A | * | 11/1983 | Angel | 224/485 |
| 4,460,205 | A | * | 7/1984 | Glance | 293/120 |
| 4,468,052 | A | * | 8/1984 | Koike | 280/784 |
| 4,563,028 | A | * | 1/1986 | Ogawa et al. | 293/122 |
| 4,974,891 | A | * | 12/1990 | Furuta | 293/104 |
| 5,314,229 | A | * | 5/1994 | Matuzawa et al. | 296/187.09 |
| 5,378,031 | A | * | 1/1995 | Ohno et al. | 293/102 |
| 5,566,777 | A | * | 10/1996 | Trommer et al. | 180/232 |
| 5,727,827 | A | * | 3/1998 | Shibuya et al. | 293/155 |
| 5,803,517 | A | * | 9/1998 | Shibuya | 293/120 |
| 5,927,778 | A | * | 7/1999 | Uytterhaeghe et al. | 293/120 |
| 6,042,163 | A | * | 3/2000 | Reiffer | 293/155 |
| 6,068,330 | A | * | 5/2000 | Kasuga et al. | 296/187.09 |
| 6,152,521 | A | * | 11/2000 | Hayashi et al. | 296/187.09 |
| 6,398,275 | B1 | * | 6/2002 | Hartel et al. | 293/102 |
| 6,467,821 | B2 | * | 10/2002 | Hirota | 293/120 |
| 6,474,708 | B1 | * | 11/2002 | Gehringhoff et al. | 293/120 |
| 6,494,510 | B2 | * | 12/2002 | Okamura et al. | 293/149 |
| 6,502,874 | B2 | * | 1/2003 | Kajiwara et al. | 293/133 |
| 6,547,294 | B2 | * | 4/2003 | Yamamoto | 293/105 |
| 6,644,701 | B2 | * | 11/2003 | Weissenborn et al. | 293/120 |
| 6,648,385 | B2 | * | 11/2003 | Frank | 293/133 |
| 6,659,518 | B2 | * | 12/2003 | Ponsonnaille et al. | 293/102 |
| 6,712,410 | B2 | * | 3/2004 | Kudelko et al. | 293/102 |
| 6,729,429 | B2 | * | 5/2004 | Takahashi | 180/271 |

FOREIGN PATENT DOCUMENTS

| | | |
|---|---|---|
| DE | 41 10 436 A1 | 1/1992 |
| DE | 195 11 868 A1 | 10/1996 |
| DE | 197 44 274 A1 | 4/1999 |
| DE | 298 23 973 U1 | 4/2000 |
| DE | 198 49 358 A1 | 5/2000 |
| DE | 199 04 879 A1 | 8/2000 |
| EP | 0 664 244 A1 | 7/1995 |
| EP | 0 650 868 B1 | 6/1997 |
| EP | 0 894 675 A1 | 2/1999 |
| JP | 11-255049 | 9/1999 |

* cited by examiner

*Primary Examiner*—H. Gutman
(74) *Attorney, Agent, or Firm*—Henry M. Feiereisen; Ursula B. Day

(57) ABSTRACT

An attachment element for a bumper includes a partially closed profile with a back panel and on each side lateral tension struts, a bottom plate, or a cover, wherein the attachment element is configured as a part of the bumper and the configuration of the attachment element acts as crash absorbing element which can absorb shock impacts of up to 4 km/h in an elastic range and at shock impacts between 4 km/h and 15 km/h the crash absorbing elements deform thereby preventing damage to the vehicle carrier.

9 Claims, 5 Drawing Sheets

BUMPER WITH CRASH ABSORBING ELEMENT

CROSS-REFERENCES TO RELATED APPLICATIONS

This application claims the priority of German Patent Application Serial No. 102 11 233.9, filed Mar. 13, 2002, pursuant to 35 U.S.C. 119(a)–(d).

BACKGROUND OF THE INVENTION

The invention relates to a bumper and in particular to the attachment of a bumper at a front end carrying structure or of a vehicle frame for absorbing deformations upon impact so as to prevent damage to the front end beam of the vehicle frame.

From the prior art DE 197 44 274A1, a bumper is known which is configured as an extruded profile attached to a longitudinal beam (front end beam) of the vehicle, where the bumper is mounted to the longitudinal beam. The end portions of the extruded profile of the bumper, which are connected to the longitudinal beam, are configured as crash absorbing elements and can absorb impacts up to 15 km/h in a so-called solid wall test. In such a test, vehicles are driven against a wall at the above-mentioned speed. Although this extruded profile fulfills all legal requirements prescribed in regulation EWG96/76 EG for the solid wall tests, the bumper disclosed in DE 197 44 274A1 both, that is, the extruded profile as well as the bumper mounted thereon are necessary for its functioning and requires assembly of at least two parts and thus resulting in a comparatively high overall weight.

EP 06 64 244A1 discloses a shock absorbing element used as an inlay between the external skin of the bumper and the vehicle beam with at least one shock absorbing rib. The rib comprises two spring legs, with each spring leg consisting of an impact transfer portion, an attachment portion and a curved portion impact absorption section connecting the impact transfer portion and the attachment portion. The spring legs are connected to each other in the area of the impact transfer portion. The distance of the two undeformed opposite spring legs is smaller in the impact-transfer-portions-proximate area than in the attachment-portions-proximate area of the impact absorption portions. In EP 06 64 244A1 a shock absorbing element absorbs a series of smaller impacts exhibiting an elastic deformation behavior at impact speeds over 4 km/h.

In the area close to the attachment portion, the spring legs extend along an attachment support and the curved attachment portions are directed away from the attachment support so that under a compressive stress acting upon the spring leg, areas of the curved shock absorbing portions are bearing increasingly upon the attachment base in a roll-off motion, thereby lowering their respective radius of curvature.

Since the rib is formed from two connected curved spring legs, which, in the area of the attachment portion, bear flat upon an attachment base, such as a beam or an outer surface of the bumper, and facing away form the attachment base are curved inwardly, further sections of the curved shock absorbing area are rolled onto the attachment surface under increasing impact force. The impact energy is thus dissipated by a successive rolling movement of the spring legs, whereby the deformation does not occur solely along a single buckling line but along a broad, 2-dimensional portion of the spring leg. Thus, a damper element which can withstand multiple impacts of a comparatively high force without loss of elasticity and without material fatigue is realized. However, the disclosed bumper works well for the shock absorption of low speed impact.

DE 41 10 436A1 discloses and describes mounting a bumper onto a longitudinal beam or a front-end beam. Deformation resistance of any part of the bumper is not disclosed, which implies, subjecting the disclosed single-piece bumper on the longitudinal beam or the front end beam to any force, will lead directly to a deformation of said beams. As a consequence higher costs for replacement or repair are experienced, since any impact, even a low speed impact, may cause damages to the bumper as well as the bumper beam.

EP 06 50 868A1 discloses a means of attachment for a bumper in the shape of a deformable mounting bracket. The bracket will deform as a consequence of an impact when the vehicle moves in frontal direction (x-coordinate), but nothing is disclosed about any lateral impact (x and y coordinates or y coordinate only).

DE 19511868A1 discloses a bumper with a bending beam, which is provided with crash absorbing elements. The bending beam is integrally connected with the crash absorbing elements, which extend at a right angle. The crash absorbing elements are provided with flanges, which serve as a connection with a longitudinal beam. The bending beam and the integrally connected crash absorbing elements are configured as two shells. For production-technical reasons it is not possible, to manufacture unitary bending beams and crash absorbing elements. The two shells must be assembled prior to incorporation whereby the assembly is carried out by means of techniques such as welding, pressure joining, gluing, riveting or screwing. Thus, at a normal drive speed, any impact will certainly be absorbed through the bending beam and the deformation elements, however the production of the bending beams is rather complex due to the additional production steps of assembling the shells.

In order to protect the bending beam properly—against shock impact at a low drive speed—it is necessary to provide an impact absorber at the front side of the bending carrier.

Thereby it is realized that the bending carrier absorbs impacts up to 15 km/hr, which however requires an assembly of at least five building elements, such as a bumper, two bending carrier shells and two impact absorbers. In addition, the bending beam is made of metal and exhibits no elasticity, so that for even small impacts an elastic yielding cannot be realized. Accordingly, when the bumper cannot deform in an elastic manner, there subsists the danger of damage to the bumper even upon very small impact. Whereas damage of this type may not always render the bumper unsuitable for use, it spoils the optical impression of the vehicle.

Likewise with the bumper disclosed in DE 19511868A1, the bumper disclosed in DE 298 239 73U1 includes several assembly parts, wherein even the profiled body and each of the crash absorbing elements are configured as separate parts. Impacts are introduced at the bumper into the metal sheet (or form part). In its function and arrangement, this metal sheet corresponds to the bending beam as disclosed in DE 19511868A1.

In laid open publication DE 19904879A1 it is envisioned that with changes in the wall thickness in the bumper beam with the use of the deformation elements, the level of force can be dissipated across the entire cross section of the bumper. The wall thickness of the inner walls of the crash absorbing elements is thus substantially inferior to the wall thickness of the exterior sidewall of the hollow profiled deformation elements. When the force level, which is composed of the longitudinal force and the bending stress is homogenized, three-dimensional extensions of the inner side of the longitudinal carrier are avoided. Thus, due to the inferior wall thickness of the crash absorbing elements, the transverse carriers will buckle or fail before the transverse beam deforms in a three-dimensional manner with a definite impact force. This solution is advantageous, if the crash absorbing element is easily dismantled from the bumper but not disclosed in this publication and made obvious only through DE 29823973U1. When the crash absorbing elements are integrally formed with the bumper beam, both bumper beam and crash absorbing element must be replaced, if the impact does not result in a deformation in an elastic range. Since the bumper is mounted at the bumper carrier proper, both parts must be replaced in case of a three-dimensional deformation.

A similar type of bumper is disclosed in DE 19849358A1. The crash absorbing element is directly integrated into the bumper carrier but not into the attachment of the bumper beam at the longitudinal beam of the vehicle. Locally varying values of flexural strength are realized by means of partial hardening of the bumper beam, whereby the non-hardened portions are able to take up the deformation as crash absorbing elements. This embodiment functions excellent when involved in a frontal impact situation, however, any case of a lateral impact causes much less deformation and thus it becomes much more likely that three-dimensional deformations occur. Such deformation is not going to be transmitted into the longitudinal beam, however also in this embodiment the bumper (which is not shown) and bumper beam must be provided with at least one deformation element which is integrated or which is configured as an additional assembly piece.

From the prior art as further disclosed in EP 894675A1 a bumper beam assembly including a bumper transverse beam incorporating several wall elements is disclosed. The spatial arrangement of the wall elements is configured as to provide impact force absorbing properties. However, the number of single parts still exceeds the number of parts disclosed in the previously discussed prior art. The bumper beam itself is not a unitary piece but is made from profiles that are assembled from four plates, which requires for a considerable number of production steps.

JP 11255049A discloses a bumper transverse beam with crash elements incorporated therein. Thus, a shortening of the distance between the longitudinal beam and the bumper surface is realized, however it is not quite obvious how the bumper beam can be dismantled from the longitudinal beam, in particular after impact when there are areas around the crash elements showing a three-dimensional deformation behavior.

It would therefore be desirable and advantageous to provide an improved bumper with means to obviate prior art shortcomings and to provide a bumper for absorbing deformations upon impact so as to prevent damage to the front end beam of the vehicle frame.

SUMMARY OF THE INVENTION

One aspect of the invention is to provide an attachment part at a bumper which acts as a crash absorbing element and forms unitary part of the bumper, for the purpose of absorbing crashes up to 4 km/h in the elastic range, and absorbing crashes up to 15 km/h by being deformable in such a way as to prevent the transmission of forces to the front end beam.

According to one feature of the present invention there is foreseen an attachment part for a vehicle bumper for attachment of the bumper to the vehicle frame, wherein the attachment part is configured as a crash absorbing element. The attachment part is part of the bumper and is configured as a partially closed profile, including a lateral tension strut and a bottom plate.

In accordance with another aspect of the invention, a fewer number of parts are necessary to make the bumper in order to reduce the production cost. In accordance with the present invention, the transverse beam and the bumper function are combined into one single part. As compared to the prior art, the bumper itself provides the function of crash absorption, which function would otherwise be distributed among at least two or more parts. The attachment elements are thus configured as the crash absorbing elements. Accordingly, the crash absorbing element is shaped as a weakened section of the bumper working as an element for controlled buckling behavior.

It is another aspect of the invention, to reduce the overall length of the vehicle, which is normally extended due to the presence of a crash zone. In lieu of the crashbox known from the prior art, the crash absorbing element, which is configured as an attachment element, assumes at least partially the function of the crashbox.

According to yet a further feature of the present invention, the tension struts of the attachment element collapse together, which corresponds to the function of a crash element. The tension struts exhibit stiffness in a z-direction. In this context the z-direction corresponds to a vertical direction, x-direction corresponds to the coordinate in driving direction, and y-direction corresponds to the direction transverse to the driving direction. The crash absorbing element is configured as a partially closed profile which includes a bottom plate or a retro-fitted side plate, for example as part of a cover and which deforms at impacts of up to 4 km/h in elastic manner and upon impacts up to 15 km/h in a manner to preclude damage to the vehicle. The rear portion of the profile, the back panel is provided with an attachment means and attached to the front-end beam or at the vehicle frame. For attachment purposes, one or more bores are provided in the back panel. All parts of the profile, which form the attachment part, can be provided with ribs, which can serve as a local enlargement of the cross section, to thereby optimize the buckling behavior. The lateral tension struts and the bottom plate can be configured with varying wall thickness and are at least partially connected to each other.

Preferably, the attachment part is from plastic and in conjunction with bumper produced formed as an injection molded piece.

Advantageously, the attachment of the bumper to the vehicle beam simplifies its positioning at the vehicle thereby preventing clearance problems. During the afore-described Allianz-Crash test (15 km/h against a solid wall), the bumper collapses by folding or buckling in a determined buckling pattern. Consequently, the front end beam or the vehicle frame remains undamaged.

When the bumper is mounted directly at the vehicle frame via the attachment elements, only the distances from the attachment element to the vehicle frame must be considered, thus leaving more degrees of freedom to coordinate the contour of the bumper with the radiator, the front and rear lamps and the tailgate or similar. In addition, the attachment elements can have a certain degree of clearance so that small errors in the contour measurements are adjustable by means of the positioning of the attachment elements relative to the vehicle frame. In a further advantage of the bumper according to the present invention, small shock impacts can be elastically absorbed by the bumper.

An additional advantageous feature of the present invention is the attachment of the bumper directly to the front-end beam or vehicle frame. The direct attachment of the bumper to the front-end beam or the vehicle frame has the advantage of simplifying gap tolerance problems to a considerable extent. Small shock impacts upon the crash absorbing element at the bumper introduce forces which will normally lead to reversible deformations due to the elastic properties of the plastic material used. Thus, the bumper can yield so that dents and bumps, which would spoil the optical impression of the car, are prevented.

According to another feature of the present invention, the attachment part includes a back panel, at lest two tension struts and a bottom plate. The bottom plate is provided with baffle for connecting the two tension struts. The baffle can be configured partially as a bead.

Advantageously, a cover can be mounted on, or incorporated in the bumper as a covering element, to hide the crash absorbing element. Such a covering element may easily be integrated into said bumper surface during the manufacturing process. In this manner the production, that is the mounting of the cover can be simplified, whereby it is also possible to provide a uniform color of the vehicle (i.e. during the process of applying lacquer) as well as a uniform configuration (tolerances can be determined during production and can be adjusted without the need for retrofitting at the dealer).

The attachment part can be connected to the bead in a removable manner, wherein the bead may for example be configured as a cover. The cover is provided with at least two webs, utilized for the mounting of the cover at the attachment part of the bumper. The distance between the two webs is smaller than the distance between the tension struts to thereby realize a sufficient attachment force for the connection between panel and bumper.

In accordance with a further embodiment of the present invention, these webs form a tension strut a press-in or plug-in connection.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
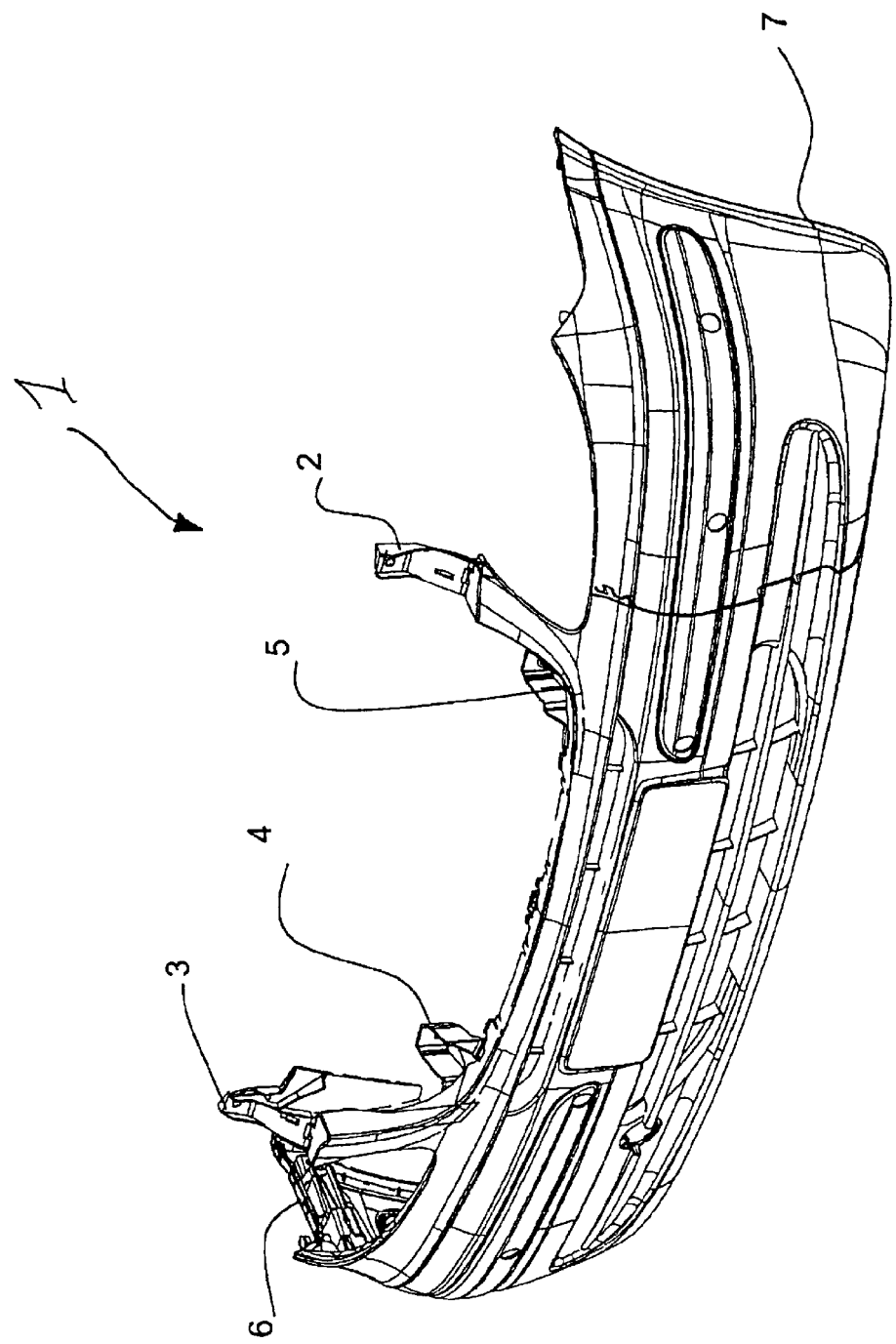
FIG. 1 is a perspective front view of a first embodiment of a bumper according to the present invention.

Throughout all the Figures, same or corresponding elements are generally indicated by same reference numerals.

Turning now to the drawing, and in particular to FIG. 1, there is shown a bumper 1 in perspective view. The bumper 1 is releasably connected at attachment parts 2, 3, 4, 5 to the vehicle carrying structure (not represented). Additional attachment elements may be provided at the side flanges 6, 7 in order to attach the bumper in its position relative to other vehicle parts and to observe the appropriate tolerances and gaps. It is understood that the function of the bumper is not limited to the absorption of shocks, but can incorporate brackets for lighting fixtures, sensors and their cables as well a license plate or similar.

If the bumper is subjected to a bump or shock impact, impact forces are introduced into the vehicle carrying structure through the attachment parts 4, 5. Therefore, at least the attachment parts 4, 5 are configured as crash absorbing elements in order to absorb these forces in a controlled way. In the following paragraphs, the attachment elements in their combined function as crash absorption elements will commonly be referred to as attachment parts.

Figure 2:
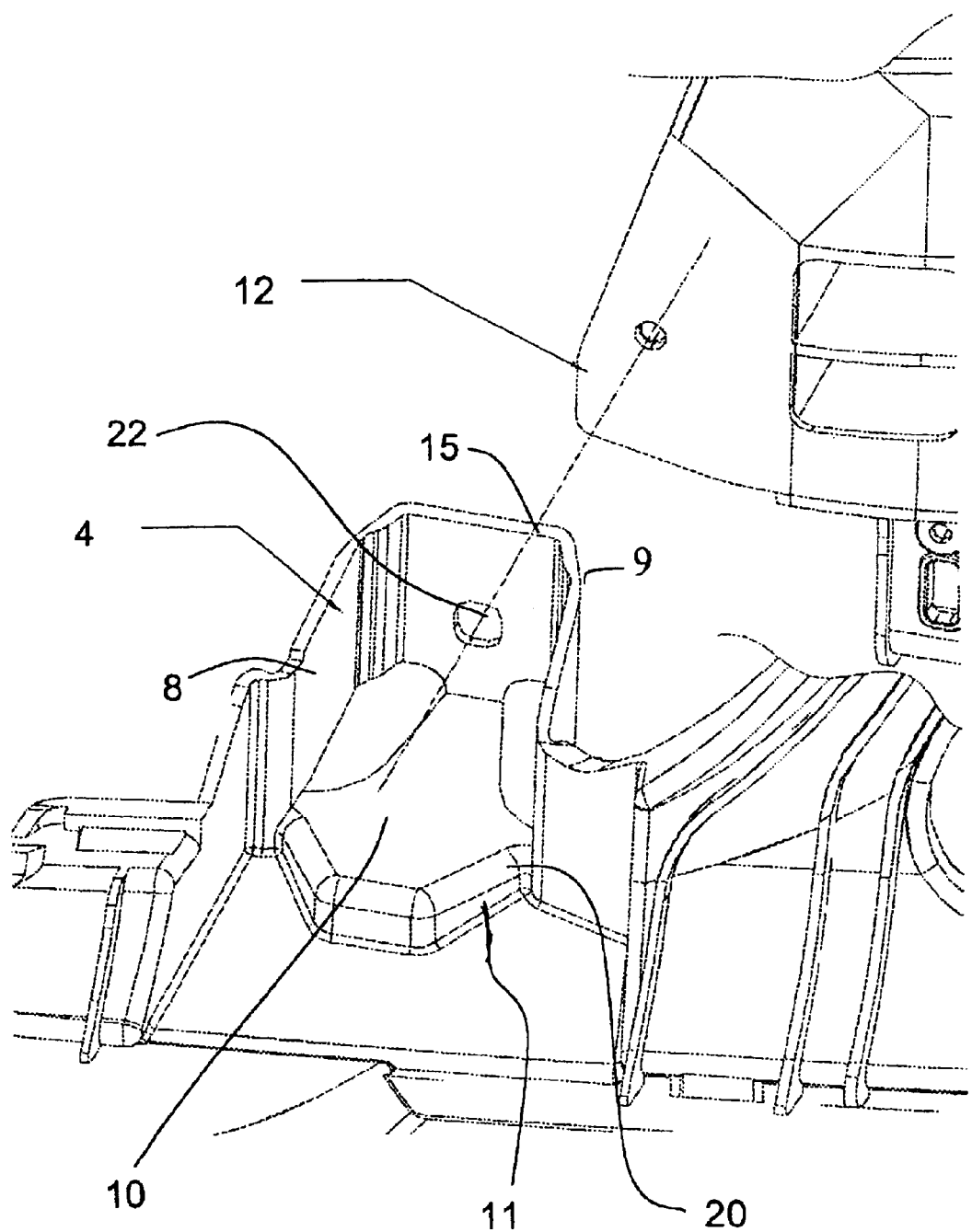
FIG. 2 is a front perspective view of the crash absorbing element.

One of these attachment parts and crash absorbing elements is represented in FIG. 2. The crash absorbing element forms a single piece with the bumper and is capable of elastic absorption of an impact at a speed of up to 4 km/h. When subjected to shocks up to 15 km/h the combined attachment parts and crash absorbing elements deform in such a way, that no forces are transmitted to the vehicle carrying structure.

The combined attachment part and crash absorbing element 4 is foreseen as a buckling and rupture element. During the Allianz-crash test, the bumper collapses by folding and buckling in a predictable way and the front end carrying structure remains undamaged.

The attachment part 4 includes at least one tension strut 8, 9, a back panel 15 and optionally a bottom plate 10. FIG. 2 shows two tension struts 8, 9; however additional struts can be employed. The tension struts 8, 9 extend radially from the end part of the back panel 15 and end at the inner surface of the bumper (not shown here). The tension struts 8, 9 of the attachment part and crash absorbing element collapse together, thereby acting as a crash element. The back panel 15 is used for attachment elements 22. Screws, rivets, clip-on connections are only cited as an example of possible fastenings of the attachment elements. By means of one or more of the fastening elements 22, attachment of the bumper to the front-end carrying structure or the vehicle frame 12 is realized. The tension struts 8, 9 exhibit an increased stiffness in the direction of the vertical axis (z-axis), and the bottom panel 10 shows increased stiffness in the direction of the x-axis. The bottom panel 10 is connected in part or as a whole to the tension struts 8, 9.

When the front part of the bottom panel is configured as a cover 13 or a trim part, it comprises a substantially vertical baffle 11 with a wall thickness that is greater than the lateral edge of the attachment element. The baffle 11 serves as a carrying structure during the usual operation of the vehicle and is designed to avoid any distortion due to weight and/or wind forces. Additionally, the stiffness in the x-direction is enhanced by the integration of the baffle 11 thereby ensuring, that any impact caused by a shock impact occurring at a speed of not more than 4 km/h may be absorbed in the elastic range and therefore the bumper bounces back into its original position.

For any shock caused by an impact or a series of impacts in a speed range of 4 up to 15 km/h, the crash absorbing element buckles and folds. If the bottom panel 10 is connected over its entire length with the tension struts 8, 9, the buckling of the bottom panel 10 and the buckling of the tension struts 8, 9 occur contemporaneously.

When forces resulting from the shock act in a direction opposite to the driving direction (negative x-coordinate) the tension struts 8, 9 buckle inwards or outwards by folding up.

The consequence of the impact force acting in an angle to the driving direction is a three-dimensional buckling effect and a torsional displacement of the tension struts 8, 9. Due to the additional baffle effect of the floor panel 10, the buckling may not be limited to a folding effect, which results in a longitudinal contraction of the damping element but additionally, includes an overlapping torsional displacement resulting in a change of the spatial position of the bumper 1 with respect to the vehicle. To counteract this effect, a dimensional change of the combined attachment part and crash absorbing element may lead to the back panel 15 having advantageously a thicker wall than the tension struts 8, 9 or being reinforced by ribs 17 thereby ensuring that the back panel 15 does not undergo torsional displacement. The bottom panel may have at least one baffle 11 to enhance dimensional stability. In FIG. 2 it is disclosed that the baffle 11 also assumes the function of stiffening the attachment of the bumper with the attachment part. This baffle 11 may have at least partially increased cross-section in a protrusion 20. The protrusion may be thicker as compared to the tension struts or the back plate, because the protrusion 20 assumes an additional carrying function. Due to the protrusion, the bumper does not tilt or bend during normal vehicle operation. If wind forces are acting on the bumper or strong vibrations due to bumpy roads, which are not negligible compared to the proper weight of the bumper itself, a reinforcement such as said protrusion may be necessary, depending on the bumper design.

Figure 3:
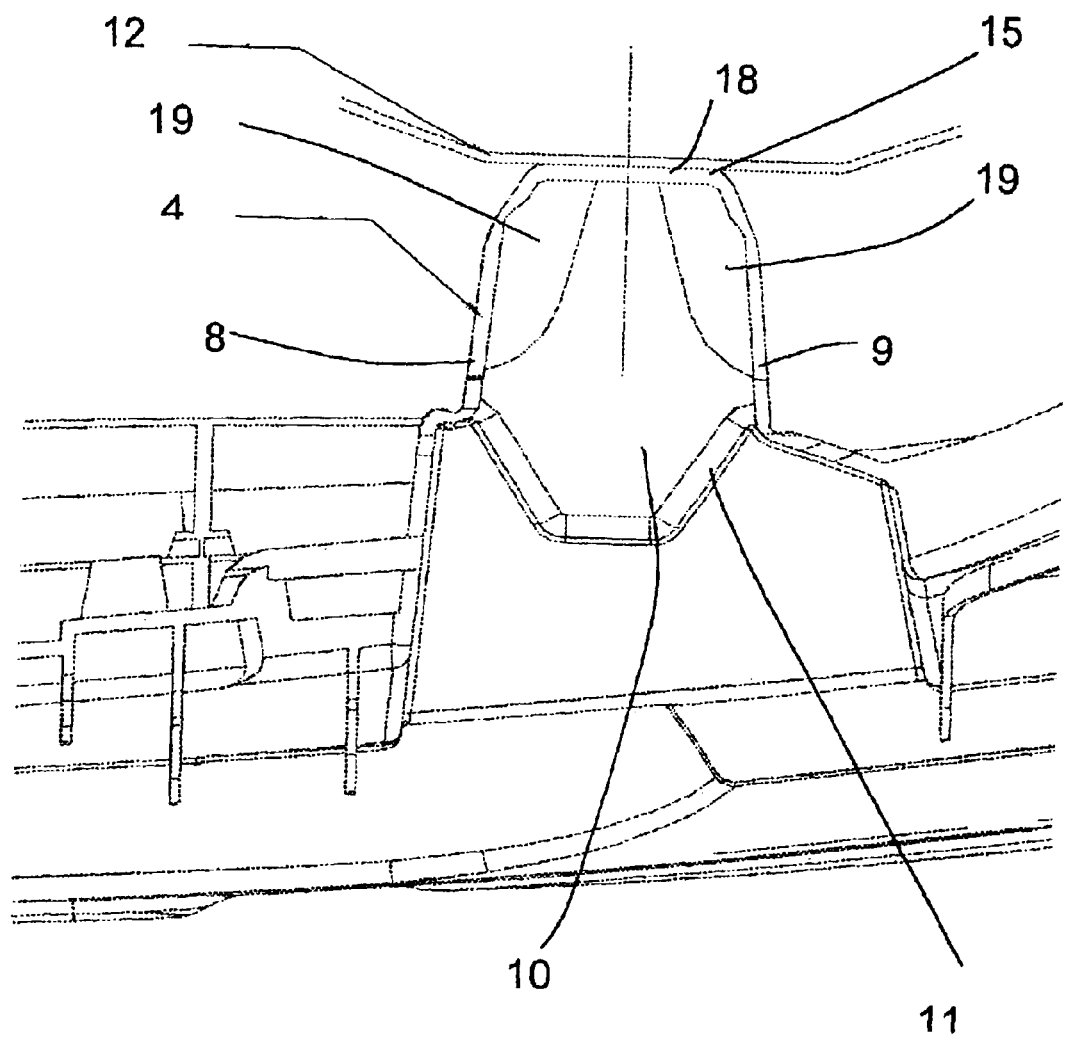
FIG. 3 is a top view of a second embodiment of the crash absorbing element.

FIG. 3, an alternative embodiment of the crash absorbing element 4 is shown in a top perspective view. The bottom panel 10 has additional lateral recesses 19, which allow for an elastic buckling of the tension struts 8, 9 and the buckling of the bottom panel 10. In this embodiment, a decoupling of the deformations due to the horizontal component of the drive forces in drive direction from the horizontal component of the drive force transverse to the drive direction takes place. Each of these forces effects the introduction of pressure tension and bending stresses. The floor plate or bottom panel 10 together with the tension struts 8, 9 absorb the horizontal forces. The vertical force components are mainly introduced to the tension struts 8, 9 where they generate a bending stress. Depending on the contact part of the forces, the zone of the tension stress is either in the lower portion of the tension strut 8, 9 or in the upper portion, when the impact force is in direct proximity of the roadway. To counteract this effect, recesses 19 are formed in the bottom panel 10, in order to provide for the introduction of high bending stresses for the two afore-described situations, before the occurrence of any failure, that is, buckling of the tension struts.

This variation of the embodiment as a whole is less stiff than the embodiment shown in FIG. 2. The stiffness may be increased to the values observed for the embodiment shown in FIG. 2 by increasing the wall thickness for the tensioning struts 8, 9 and/or the bottom panel 15. Alternatively, several tension struts 8, 9 are provided at each side, whereby the stiffness increases such that this variation of the embodiment approaches that of the embodiment shown in FIG. 2. The fastening parts/elements 22 are preferably produced from plastic. Such a plastic material is preferably polypropylene.

Advantageously, the bumper is made as an injection molded plastic part. As the injection molding of trim parts with a closed cross-section requires more complicated tooling, a box shaped cross-section has therefore not been realized in the context of this invention. A box shaped cross-section would mean either hollow molds or additional processing steps, such as welding or gluing steps, which result in higher manufacturing costs.

Figure 4A:
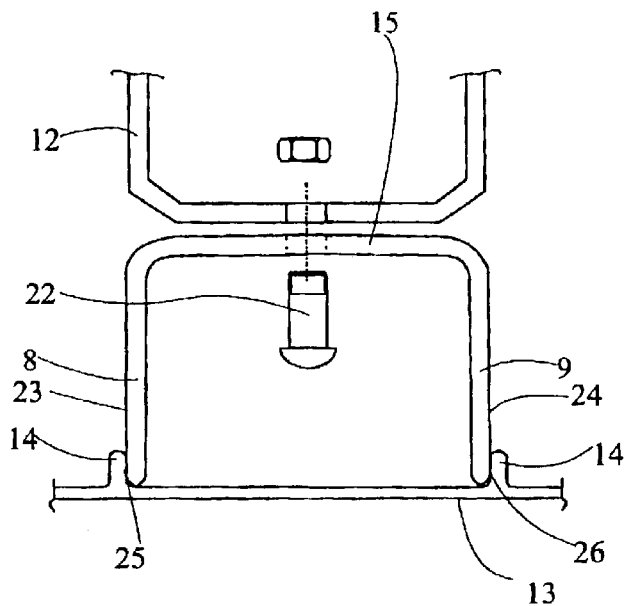
FIGS. 4a–c is a top view of a third embodiment of the crash absorbing element.

A further embodiment according to FIG. 4, is configured without a bottom plate 10. The necessary stiffness in a horizontal direction (x-y direction) may be realized by a cover 13, which is assembled in a subsequent step, at the same time the bottom panel 15 is dispensed with. The advantage of a separate cover is the possibility to exchange it easily in particular, when it shows minor damages such as scratches or buckles on its surface. In addition to serving a decorative function, the cover 13 may assume the function of a baffle in horizontal and/or vertical direction. The cover 13 is plugged onto or hooked onto the tension struts 8, 9. The plug-in connection between the cover 13 and the bumper 1 is in accordance with FIG. 4, wherein the distance between of the two webs 14 in FIG. 4a is smaller than the distance of the outer surfaces 23, 24 of the struts. The plug-in connection has the effect of a press fit. The outer surfaces of the tension struts 23, 24 exercise a pressure force onto the inner edges 25, 26 of the webs 14 of the cover 13.

The section 21 of cover 13, which is located between the tension struts 8, 9 are under pre-tension, thereby realizing a balancing of tension prior to a deformation. Thus a portion of the deformation forces are introduced into the tension balancing such that the larger shock impact forces can impact upon the bumper.

Figure 4B:
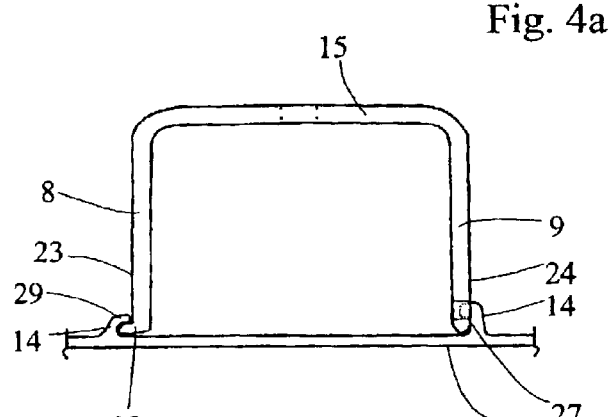

FIG. 4b shows a further embodiment of a plug-in connection. The web 14 as seen on the right side is provided with a curved part 27 ending in a projection which engages into an opening at tension strut 9. In this embodiment, the tension strut 8 is likewise provided with a curved projection. The projection 28 can have smaller cross section relative to the tension strut. The counterpart at the cover 13 is configured unlike a web; instead it is configured with a curvature or hook like projection 30 in opposite direction to the curvature in the tension strut projection 28. Projection 28 and projection 30 hook into each other and form a tight connection, which does not uncouple even under impact of wind forces and other minor shock impacts. The combination of coupling mechanisms is not limited to the embodiment. Two webs 14 can be provided with a curved projection 27, wherein the curvature of the left-hand coupling mechanism mirrors the curvature of the right hand coupling mechanism. In a similar manner, the hook mechanism can also be configured from a tension strut 8, 9 having a projection of bend-in ends and a hook-like projection 29 and for mirroring an additional set-up. The choice of coupling mechanism is determined by the dimension and geometry of the bumper 1 and cover 13 and the materials used as well as by the production methods of these parts.

Figure 4C:
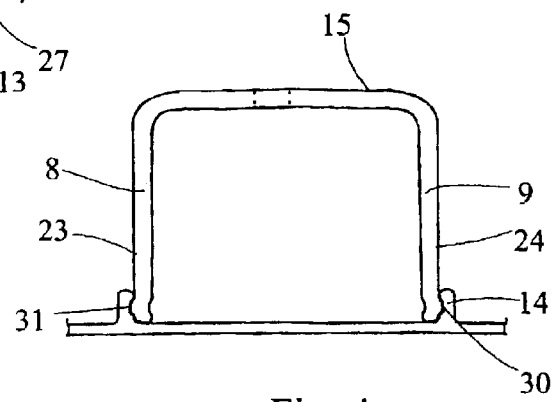

In accordance with FIG. 4c, instead of a projection having a curvature or a hook mechanism, the tension strut can be provided with a bulge 30, which engages into the indentation 31 of the web 14 of cover 13. The bulge 30 can also be placed on the web 14 and the indentation on the tension struts 8, 9.

Figure 5:
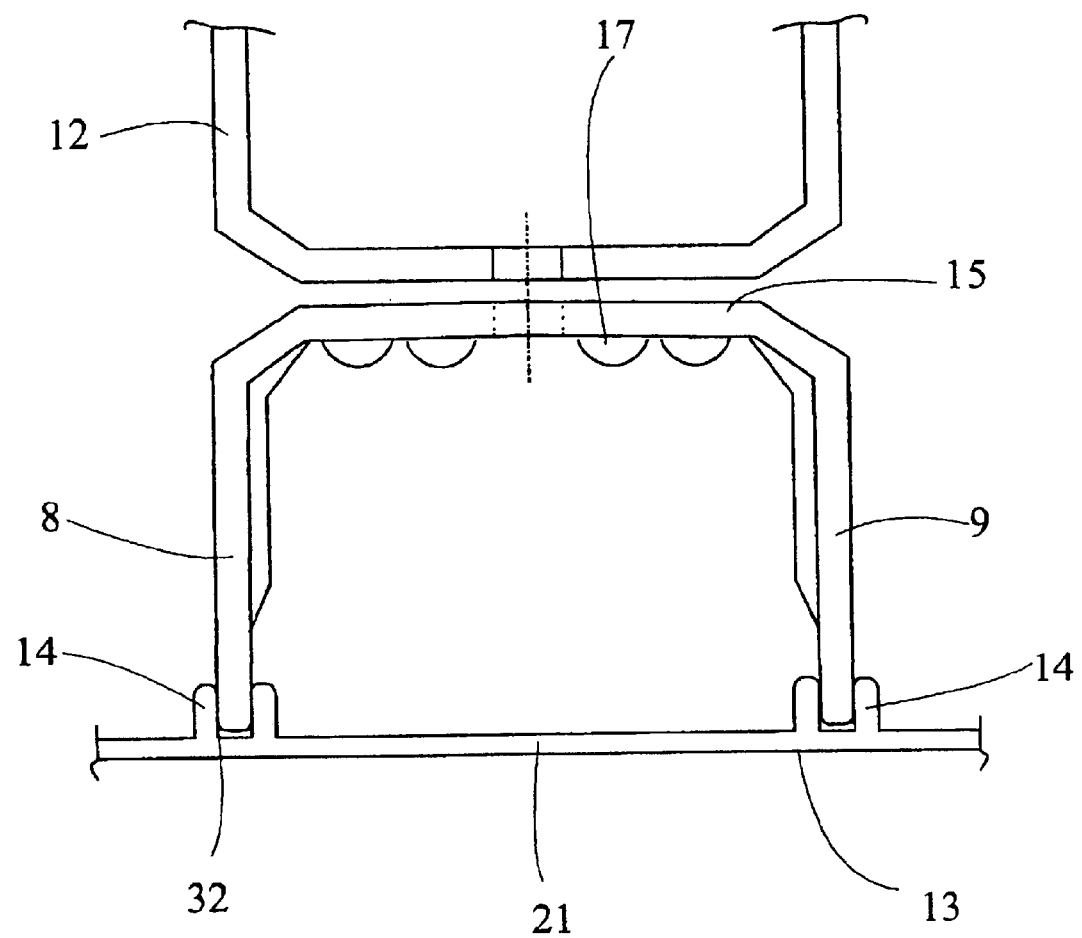
FIG. 5 is a top view of an alternative for the connection according to the embodiment of FIG. 4.

As an alternative to the embodiment as described in connection with FIGS. 4a to 4c, the plug-in connection can also be realized without any pre-tensioning or only a slight pre-tensioning, wherein a slot 32 is provided at cover 13 as shown in FIG. 5. There, the cover 13 is positioned within slots 32 under light pressure onto the tensioning struts 8, 9.

While the invention has been illustrated and described as embodied in a bumper having crash absorbing attachment elements, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A bumper for a vehicle configured for attachment of the bumper to a front-end beam or a vehicle frame comprising:
    at least one attachment part acting as a crash absorbing element and molded with the bumper as a unitary one-piece, said at least one attachment part including an open profile member having a back panel with attachment means, lateral tension struts and a bottom panel connected to said tension struts, wherein the bottom panel is provided with a baffle extending laterally at an angle relative to the longitudinal axis of the vehicle.

2. The bumper of claim 1, wherein the tension struts are provided with regions of variable thickness.

3. The bumper of claim 1, wherein the bottom panel is provided with regions of variable thickness.

4. The bumper of claim 1, wherein the bumper and attachment part are injection molded by a single step process.

5. The bumper of claim 1, wherein the bumper and attachment part are made of plastic material.

6. The bumper of claim 5, wherein bumper and attachment part are made of thermoplastic.

7. The bumper of claim 1, wherein the baffle is provided with at least a partially increased cross-section forming a protrusion.

8. The bumper of claim 7, wherein the protrusion has a greater thickness than one of the tension struts and a back plate.

9. The bumper of claim 1, wherein the bottom panel is at least partially connected to the tension struts.

* * * * *